United States Patent
Inagaki et al.

(10) Patent No.: US 8,725,045 B2
(45) Date of Patent: May 13, 2014

(54) TUBULAR ARTICLE, TUBULAR ARTICLE UNIT, INTERMEDIATE TRANSFER MATERIAL, AND IMAGE FORMING APPARATUS

(75) Inventors: Tomotake Inagaki, Kanagawa (JP); Yousuke Tsutsumi, Kanagawa (JP); Shigeru Fukuda, Kanagawa (JP); Tomoo Matsushima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 571 days.

(21) Appl. No.: 13/074,406

(22) Filed: Mar. 29, 2011

(65) Prior Publication Data
US 2012/0051802 A1 Mar. 1, 2012

(30) Foreign Application Priority Data
Aug. 26, 2010 (JP) ................. 2010-189793

(51) Int. Cl.
- G03G 15/01 (2006.01)
- B32B 1/08 (2006.01)
- B29C 47/00 (2006.01)

(52) U.S. Cl.
USPC ............................ 399/302; 428/36; 428/36.91

(58) Field of Classification Search
CPC ............. B32B 27/281; B32B 2597/00; G03G 15/162; G03G 15/754
See application file for complete search history.

(56) References Cited

FOREIGN PATENT DOCUMENTS

| | | |
|---|---|---|
| JP | A 9-274402 | 10/1997 |
| JP | A 2000-137396 | 5/2000 |
| JP | A 2004-191546 | 7/2004 |
| JP | A 2004-251978 | 9/2004 |
| JP | A-2010-151969 | 7/2010 |

OTHER PUBLICATIONS

Jan. 14, 2014 Office Action issued in Japanese Application No. 2010-189793 (with English Translation).

*Primary Examiner* — Clayton E Laballe
*Assistant Examiner* — Jas Sanghera
(74) *Attorney, Agent, or Firm* — Oliff PLC

(57) ABSTRACT

A tubular article includes a layer containing a polyimide resin, a fluorinated polyimide resin and fluorine resin particles as an outermost layer.

18 Claims, 6 Drawing Sheets

TUBULAR ARTICLE, TUBULAR ARTICLE UNIT, INTERMEDIATE TRANSFER MATERIAL, AND IMAGE FORMING APPARATUS

CROSS-REFERENCE TO RELATED APPLICATIONS

This application is based on and claims priority under 35 USC 119 from Japanese Patent Application No 2010-189793 filed Aug. 26, 2010.

BACKGROUND

Technical Field

The present invention relates to a tubular article, a tubular article unit, an intermediate transfer material and an image forming apparatus.

SUMMARY

According to an aspect of the invention, there is provided a tubular article including a layer containing a polyimide resin, a fluorinated polyimide resin and fluorine resin particles as an outermost layer.

BRIEF DESCRIPTION OF THE DRAWINGS

Exemplary embodiments of the present invention will be described in detail based on the following figures, wherein.

DETAILED DESCRIPTION

Exemplary embodiments of the invention will be described in detail below with reference to drawings.

Tubular Article

Figure 1:
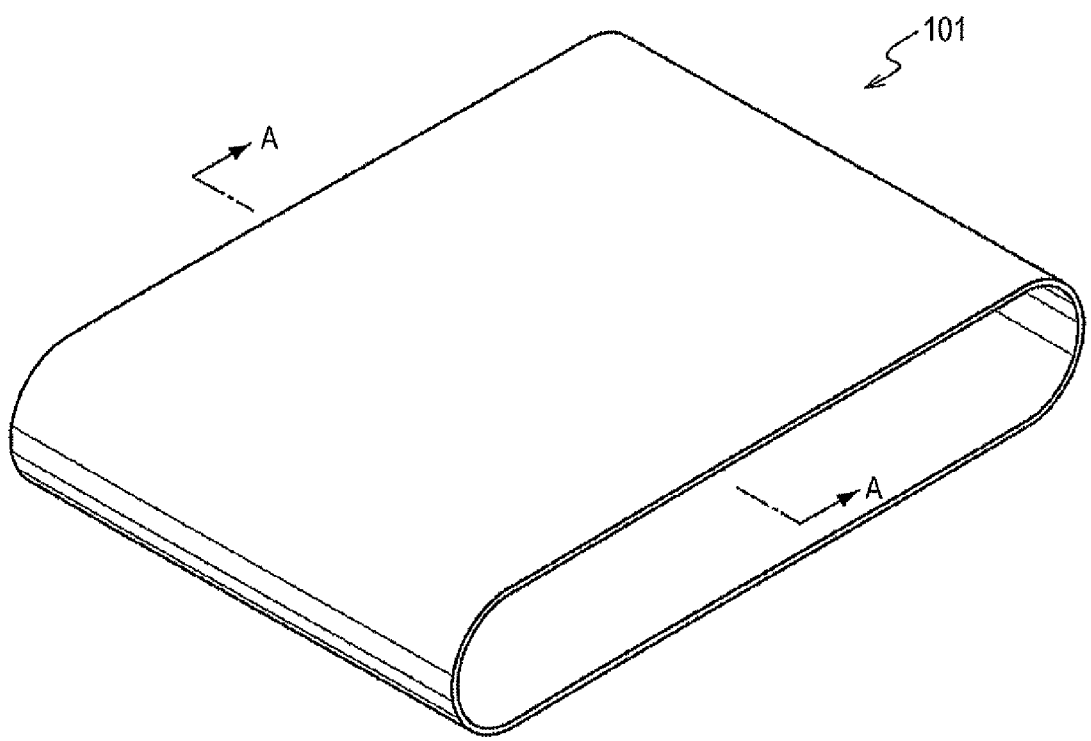
FIG. 1 is a schematic perspective view showing an example of a tubular article according to an exemplary embodiment of the invention.
Figure 2:
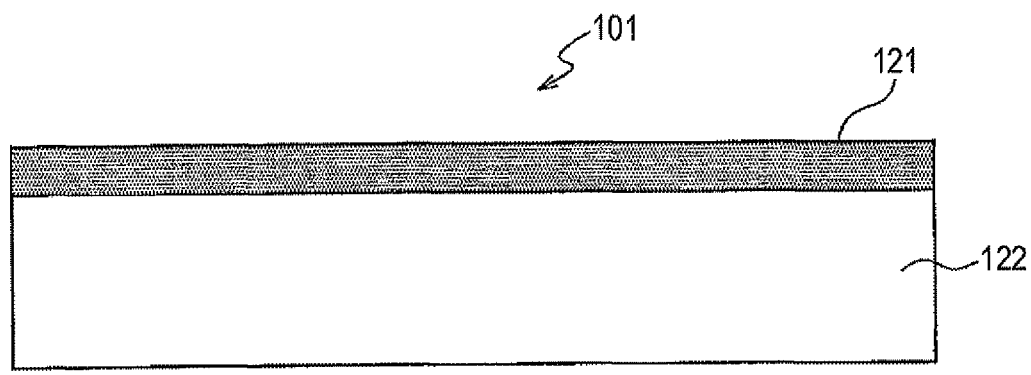
FIG. 2 is a cross sectional view on line A-A in FIG. 1.

FIG. 1 is a schematic perspective view showing an example of a tubular article according to an exemplary embodiment of the invention. FIG. 2 is a cross sectional view on line A-A in FIG. 1.

A tubular article (which may be hereinafter referred to as an endless belt) 101 according to the exemplary embodiment may be, for example, as shown in FIGS. 1 and 2, formed in an endless form, and may be constituted by a substrate layer 122 having a thickness, for example, of from approximately 30 µm to approximately 80 µm, and an outermost layer 121 having a thickness, for example, of from approximately 5 µm to approximately 70 µm, which is provided on an outer surface of the substrate layer 122.

The outermost layer 121 is constituted by a layer containing a polyimide resin, a fluorinated polyimide resin and fluorine resin particles.

The endless belt 101 according to the exemplary embodiment maintains high releasing property owing to the outermost layer 121 having the aforementioned structure.

When fluorine resin particles are contained in a resin containing a polyimide resin solely, the fluorine resin particles may be dropped off or may form voids to lower the retentivity of the fluorine resin particles in the layer upon drying for forming the layer, due to the low wettability of the fluorine resin particles to the polyimide resin. The phenomenon may occur conspicuously upon using a polyimide resin that tends to have high rigidity (Young's modulus), for example, a polyimide resin having a Young's modulus of approximately 3,500 MPa or more).

It is considered that the use of a fluorinated polyimide resin in combination with the polyimide resin improves the wettability of the fluorine resin particles to the polyimide resin, and prevents drop off of the fluorine resin particles and occurrence of voids upon drying for forming the layer.

It is thus considered that the endless belt 101 according to the exemplary embodiment maintains high releasing property.

It may be considered that the addition of fluorine resin particles to a sole fluorinated polyimide resin realizes maintenance of high releasing property, but as compared to the case where a polyimide resin and a fluorinated polyimide resin are used in combination, there is a tendency that the strength of the target layer is insufficient. Furthermore, the substrate layer, which is demanded to have the strength, may be constituted by a polyimide resin, but when a layer containing the fluorine resin particles and the fluorinated polyimide resin without a polyimide resin is applied to the outermost layer 121, there is a tendency that the layers are separated from each other.

The endless belt 101 according to the exemplary embodiment will be described for the constitutional materials and the properties thereof.

The outermost layer 121 will be described.

The outermost layer 121 contains a polyimide resin, a fluorinated polyimide resin and fluorine resin particles. The outermost layer 121 may further contain a conductive agent depending on the purpose of the endless belt 101 (for example, a transfer belt, such as an intermediate transfer material (intermediate transfer belt) and a transporting transfer material (transporting transfer belt)).

The polyimide resin will be described.

Examples of the polyimide resin include an imidation product of a polyamic acid, which is a polymer of a tetracarboxylic dianhydride and a diamine compound. Specific examples of the polyimide resin include one obtained in such a manner that equimolar amounts of a tetracarboxylic dianhydride and a diamine compound are polymerized in a solvent to provide a solution of a polyamic acid, which is then imidated to provide a polyimide resin.

Examples of the tetracarboxylic dianhydride include a compound represented by the following general formula (I):

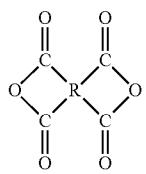

General Formula (I)

In the general formula (I), R represents a tetravalent organic group, such as an aromatic group, an aliphatic group, an alicyclic group, a combination of an aromatic group and an aliphatic group, or groups obtained by substituting these groups.

Specific examples of the tetracarboxylic dianhydride include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic acid dianhydride, perylene-3,4,9,10-tetracarboxylic dianhydride, bis(3,4-dicarboxyphenyl)ether dianhydride and ethylenetetracarboxylic dianhydride.

Specific examples of the diamine compound include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-aminobenzyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis(4-(4-aminophenoxy)phenyl)propane, piperazine, $H_2N(CH_2)_3O(CH_2)_2O(CH_2)NH_2$, $H_2N(CH_2)_3S(CH_2)_3NH_2$ and $H_2N(CH_2)_3N(CH_3)_2(CH_2)_3NH_2$.

Examples of the solvent for performing polymerization reaction of the tetracarboxylic dianhydride and the diamine compound include a polar solvent (for example, an organic polar solvent) from the standpoint of solubility and the like. Examples of the polar solvent include an N,N-dialkylamide compound, and specific examples thereof include an N,N-dialkylamide compound having a low molecular weight, such as N,N-dimethylformamide, N,N-dimethylacetamide, N,N-diethylformamide, N,N-diethylacetamide, N,N-dimethylmethoxyacetamide, dimethylsulfoxide, hexamethylphosphortriamide, N-methyl-2-pyrrolidone, pyridine, tetramethylenesulfone and dimethyltetramethylenesulfone. The solvent may be used solely or as a combination of plural kinds thereof.

The content of the polyimide resin may be from approximately 10 to approximately 80% by mass, preferably from approximately 20 to approximately 75% by mass, and more preferably from approximately 40 to approximately 70% by mass, based on the total components constituting the layer.

The polyimide resin may be used solely or as a combination of plural kinds thereof.

The fluorinated polyimide resin will be described.

Examples of the fluorinated polyimide resin include an imidation product of a fluorinated polyamic acid (i.e., a polyamic acid having a fluorine atom in the molecule thereof), which is a polymer of a tetracarboxylic dianhydride and a diamine compound. Specific examples of the fluorinated polyimide resin include one obtained in such a manner that equimolar amounts of a tetracarboxylic dianhydride and a diamine compound, in which at least one of the tetracarboxylic dianhydride and the diamine compound has a fluorine atom in the molecule thereof, are polymerized in a solvent to provide a solution of a fluorinated polyamic acid, which is then imidated to provide a fluorinated polyimide resin.

Examples of the tetracarboxylic dianhydride having a fluorine atom in the molecule thereof include 2,2-bis(3,4-dicarboxyphenyl)hexafluoropropane dianhydride, 4,4-bis(3,4-dicarboxytrifluorophenoxy)tetrafluorobenzene dianhydride, 1,4-bis(3,4-dicarboxytrifluorophenoxy)tetrafluorobenzene dianhydride, (trifluoromethyl)pyromellitic dianhydride, di(trifluoromethyl)pyromellitic dianhydride and di(heptafluoropropyl)pyromellitic dianhydride.

Examples of the diamine compound having a fluorine atom in the molecule thereof include 2,2'-bis(trifluoromethoxy)-4,4'-diaminobiphenyl, 3,3'-diamino-5,5'-bis(trifluoromethyl)biphenyl, 2,2-bis(4-aminophenyl)hexafluoropropane, 2,2-bis(4-(4-aminophenoxy)phenyl)hexafluoropropane, 2,2'-bis(trifluoromethyl)-4,4'-diaminobiphenyl, 2,2-bis(3-amino-4-hydroxyphenyl)hexafluoropropane, 2,2-bis(3-amino-4-methylphenyl)hexafluoropropane, 2,2'-difluorobenzidine, 4,4'-bis(aminooctafluoro)biphenyl, 3,5-diaminobenzotrifluoride and 1,3-diamino-2,4,5,6-tetrafluorobenzene.

Examples of the tetracarboxylic dianhydride and the diamine compound that have no fluorine atom in the molecules thereof include those exemplified for the tetracarboxylic dianhydride and the diamine compound for the polyimide resin.

Examples of the fluorinated polyimide resin include a fluorinated polyimide resin having an ether group on the main chain thereof.

Examples of the fluorinated polyimide resin having an ether group on the main chain thereof include an imidation product of a fluorinated polyamic acid, which is a copolymer of a tetracarboxylic dianhydride and a diamine compound, at least one of which has an ether group, and specific examples thereof include an imidation product of a fluorinated polyamic acid, which is a polymer of a tetracarboxylic dianhydride having an ether group (examples of which include 1,4-bis(3,4-dicarboxytrifluorophenoxy)tetrafluorobenzene dianhydride) and a diamine compound (examples of which include 1,3-diamino-2,4,5,6-tetrafluorobenzene).

It is considered that the use of the fluorinated polyimide resin having an ether group on the main chain thereof enhances the dispersibility of the fluorine resin particles, which prevents drop off of the fluorine resin particles and occurrence of voids, thereby facilitating maintenance of the high releasing property.

The content of the fluorinated polyimide resin may be from approximately 0.1 to approximately 50% by mass, preferably from approximately 0.5 to approximately 40% by mass, and more preferably from approximately 1 to approximately 30% by mass, based on the total components constituting the layer.

The fluorinated polyimide resin may be used solely or as a combination of plural kinds thereof.

Other resins may be used in addition to the polyimide resin and the fluorinated polyimide resin in such a range that does not impair maintenance of the high releasing property. Examples of the other resins include a polyamide resin, a polyamideimide resin, a polyether etherester resin, polyarylate resin, a polyester resin and a polyester resin containing a reinforcing material.

The fluorine resin particles will be described.

Examples of the fluorine resin particles include particles of a tetrafluoroethylene resin, a trifluorochloroethylene resin, a hexafluoropropylene resin, a fluorinated vinyl resin, a vinylidene fluoride resin, a difluorodichloroethylene resin and copolymer resins thereof.

Among these, in particular, polytetrafluoroethylene (PTFE, a tetrafluoroethylene resin), a tetrafluoroethylene-hexafluoropropylene-perfluoroalkyl vinyl ether copolymer (FEP), and a copolymer of tetrafluoroethylene and perfluoroalkyl vinyl ether (PFA) are preferred in the exemplary embodiment.

The fluorine resin particles may be primary particles, secondary particles having a secondary particle diameter of approximately 2 μm or less (preferably approximately 1 μm or less, and more preferably approximately 0.5 μm or less), or a mixed state thereof.

This means that the fluorine resin particles are contained and dispersed in a state of primary particles or secondary particles (an aggregated state where two or more primary particles are aggregated) or a mixed state thereof, in which the secondary particles in the aggregated state has a secondary particle diameter in the aforementioned range. In other words, the fluorine resin particles are dispersed in a state where aggregation of the particles is inhibited.

The fluorine resin particles may have a primary particle diameter (i.e., a diameter of particles that are not aggregated) of from approximately 0.1 to approximately 0.3 μm.

The primary particle diameter and the secondary particle diameter of the fluorine resin particles may be measured in the following manner. A sample having been taken from the outermost layer of the endless belt is observed with a scanning electron microscope (SEM), for example, at a magnitude of 5,000 or more, to measure the maximum diameter of the primary particles or the aggregated particles of the fluorine resin particles for 50 particles, and an average value of the measured values is obtained. The SEM used in the exemplary embodiment may be Model JSM-6700F, available from JEOL, Ltd., and a secondary electron image at an acceleration voltage of 5 kV may be observed.

The content of the fluorine resin particles may be from approximately 1 to approximately 50% by mass, preferably from approximately 2 to approximately 45% by mass, and more preferably from approximately 3 to approximately 40% by mass, based on the total components constituting the layer.

The fluorine resin particles may be used as a sole kind thereof or as a combination of plural kinds thereof.

For dispersing (containing) the fluorine resin particles in the layer, for example, a fluorine graft polymer may be used in combination as a dispersant.

Examples of the fluorine graft polymer include a copolymer of a macromonomer having a polymerizable functional group at one end of the molecular chain thereof and a polymerizable fluorine monomer having a fluorinated alkyl group.

Specific examples of the fluorine graft polymer include a graft copolymer of a macromonomer, such as a polymer or a copolymer of an acrylate ester, a methacrylate ester or a styrene compound, and a fluorine monomer, such as a perfluoroalkylethyl methacrylate or a perfluoroalkyl methacrylate.

The polymerization ratio of the macromonomer and the polymerizable fluorine monomer may be such a polymerization ratio that provides a fluorine content in the fluorine graft polymer of from approximately 10 to approximately 50% by mass, preferably from approximately 10 to approximately 40% by mass, and more preferably from approximately 10 to approximately 30% by mass.

The fluorine graft polymer may have a molecular weight in terms of a number average molecular weight of from approximately 5,000 to approximately 20,000, preferably from approximately 5,000 to approximately 17,500, and more preferably from approximately 5,000 to approximately 12,000.

The amount of the fluorine graft polymer may be from approximately 0.1 to approximately 10% by mass based on the amount of the fluorine resin particles.

The content ratio of the fluorinated polyimide resin and the fluorine resin particles may be from approximately 50:1 to approximately 1:500.

The conductive agent will be described.

Examples of the conductive agent include powder (which may contain particles having a primary particle diameter of less than approximately 10 μm, and preferably approximately 1 μm or less) having conductivity (for example, a volume resistivity of less than $10^7 \Omega \cdot cm$, hereinafter the same) or semiconductivity (for example, a volume resistivity of from $10^7$ to $10^{13} \Omega \cdot cm$, hereinafter the same).

The conductive agent is not particularly limited, and examples thereof include carbon black (such as Ketchen black, acetylene black and carbon black having an oxidation-treated surface), a metal (such as aluminum and nickel), a metal oxide (such as yttrium oxide and tin oxide), an ionic conductive substance (such as potassium titanate and LiCl), and an electroconductive polymer (such as polyaniline, polypyrrole, polysulfone and polyacetylene).

While the conductive agent may be selected depending on the purpose, an oxidation-treated carbon black (for example, carbon black obtained by applying a carboxyl group, a quinone group, a lactone group, a hydroxyl group or the like to the surface thereof) having pH of approximately 5 or lower (preferably approximately 4.5 or lower, and more preferably approximately 4.0 or lower) from the standpoint of the temporal stability of the electric resistance and the electric field dependency for suppressing electric field concentration on transferring voltage, and an electroconductive polymer (such as polyaniline) may be used from the standpoint of imparting electric durability.

The content of the conductive agent may be from approximately 1 to approximately 50% by mass, preferably from approximately 2 to approximately 40% by mass, and more preferably from approximately 4 to approximately 30% by mass, based on the total components constituting the layer.

The conductive agent may be used solely or as a combination of plural kinds thereof.

The substrate layer 122 will be described.

The substrate layer 122 contains a resin material. The substrate layer 122 may also further contain a conductive agent depending on the purpose of the endless belt 101 (for example, a transfer belt, such as an intermediate transfer material (intermediate transfer belt) and a transporting transfer material (transporting transfer belt)).

The resin material will be described.

The resin material may have a Young's modulus of approximately 3,500 MPa or more, and preferably approximately 4,000 MPa or more, while it depends on the thickness of the belt, thereby satisfying the mechanical characteristics of the belt. Examples of the resin material is not particularly limited as far as the Young's modulus is satisfied, and examples thereof include a polyimide resin, a polyamide resin, a polyamideimide resin, a polyether etherester resin, a polyarylate resin, a polyester resin and a polyester resin containing a reinforcing material.

The Young's modulus is obtained in the following manner. A tensile test is performed according to JIS K7127 (1999), and a stress-strain diagram is obtained. A tangent line is drawn for the stress-strain diagram in the initial strain region, and the Young's modulus is obtained from the gradient of the tangent line. The measurement is performed with a dumbbell No. 1 test piece in a strip form (width: 6 mm, length: 130 mm) with the thickness of the belt at a test velocity of 500 mm/rain.

Among the aforementioned resin materials, a polyimide resin may be used in the exemplary embodiment. A polyimide resin has a high Young's modulus and thus suffers less deformation on rotation operation of the belt, as compared to the other resin materials. The outermost layer 121 contains a polyimide resin, and the substrate layer 122 corresponding to the underlayer in contact with the outermost layer 121 also contains a polyimide resin, whereby it is considered that the adhesion between the outermost layer 121 and the substrate layer 122 as the underlayer is enhanced, and thus the layers is prevented from being separated from each other.

Examples of the polyimide resin for the substrate layer 122 include those exemplified for the polyimide resin for the outermost layer 121.

The conductive agent will be described.

Examples of the conductive agent used in the substrate layer 122 include those exemplified for the conductive agent for the outermost layer 121.

The characteristics of the endless belt 101 according to the exemplary embodiment will be described.

In the case where the endless belt 101 according to the exemplary embodiment is applied to an intermediate transfer material (intermediate transfer belt), the surface resistivity on the outer surface thereof in terms of common logarithm may be from approximately 9 (Log Ω per square) to approximately 13 (Log) Ω per square), and preferably from approximately 10 (Log Ω per square) to approximately 12 (Log Ω per square). When the common logarithm of the surface resistivity after lapsing 30 msec from voltage application exceeds approximately 13 (Log Ω per square), the intermediate transfer material may be electrostatically attached to a recording medium upon secondary transfer to fail to release the recording medium in some cases. When the common logarithm of the surface resistivity after lapsing 30 msec from voltage application is less than approximately 9 (Log Ω per square), the holding power of a toner image, which is primarily transferred to the intermediate transfer material, may be short, thereby causing deterioration of graininess of the image or breakage of the image in some cases. The common logarithm of the surface resistivity may be controlled by the kind and the amount of the conductive agent added, which are described later.

Figure 3A:
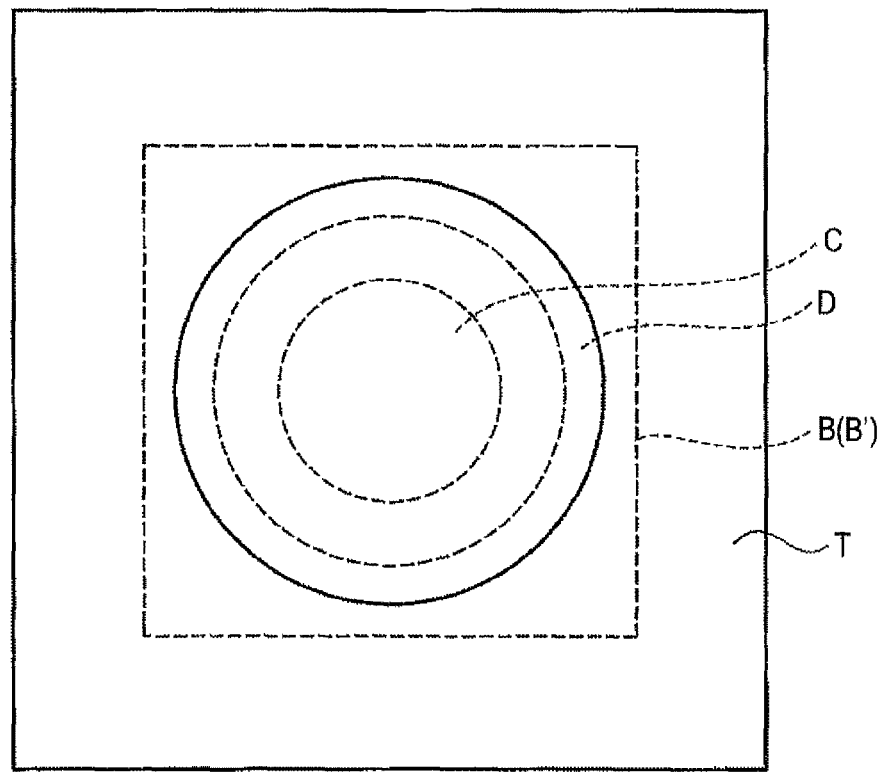
FIG. 3A is a schematic plane view showing an example of a circular electrode according to an exemplary embodiment of the invention.
Figure 3B:
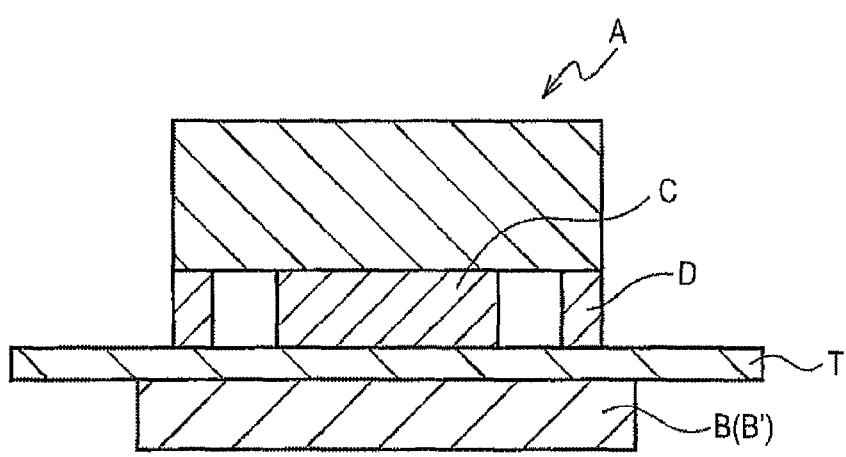
FIG. 3B is a schematic cross sectional view showing the circular electrode shown in FIG. 3A.

The surface resistivity may be measured in the following manner. The surface resistivity may be measured by using a circular electrode (for example, "UR Probe" of Hiresta-IP, available from Mitsubishi Petro-Chemical Co., Ltd.) according to JIS K6911. The measurement method of the surface resistivity is described with reference to the drawings. FIG. 3A is a schematic plane view showing an example of the circular electrode, and FIG. 3B is a schematic cross sectional view showing the circular electrode. The circular electrode shown in FIGS. 3A and 3B has a first voltage application electrode A and a plate insulating material B. The first voltage application electrode A has a cylindrical column electrode C and a cylindrical ring electrode D that has an inner diameter larger than the outer diameter of the cylindrical column electrode C and surrounds the cylindrical column electrode C with a constant space. The belt T is held between the cylindrical column electrode C and the cylindrical ring electrode D of the first voltage application electrode A and the plate insulating material B, and the electric current I (A) flowing upon application of a voltage V (V) between the cylindrical column electrode C and the cylindrical ring electrode D of the first voltage application electrode A is measured. The surface resistivity ρs (Ω per square) of the transfer surface of the belt T is calculated according to the following expression, wherein d (mm) represents the outer diameter of the cylindrical column electrode C, and D (mm) represents the inner diameter of the cylindrical ring electrode D.

$$\rho s = \pi \times (D+d)/(D-d) \times (V/I)$$

In the measurement of the surface resistivity, the electric current after applying a voltage of 500 V for 10 seconds in an environment of 22° C. and 55% RH is measured by using a circular electrode ("UR Probe" of Hiresta-IP, available from Mitsubishi Petro-Chemical Co., Ltd., outer diameter of cylindrical column electrode C: 16 mm, inner diameter of cylindrical ring electrode D: 30 mm, outer diameter of cylindrical ring electrode D: 40 mm).

In the case where the endless belt 101 of the exemplary embodiment is applied to an intermediate transfer material (intermediate transfer belt), the volume resistivity of the entire endless belt 101 in terms of common logarithm may be from approximately 8 (Log Ω cm) to approximately 13 (Log Ω·cm). When the common logarithm of the volume resistivity is less than approximately 8 (Log Ω·cm), the electrostatic force for retaining the charge of the unfixed toner image transferred from the image holding member to the intermediate transfer material may be short, and the toner may be scattered around the image by the electrostatic repulsive force of the toner and the force of the fringe electric field, thereby forming an image with large noise in some cases. When the common logarithm of the volume resistivity exceeds approximately 13 (Log Ω·cm), the retaining force of the charge may be too large, and an erasing mechanism may be necessary in some cases for charging the surface of the intermediate transfer material in the transfer electric field on primary transfer. The common logarithm of the volume resistivity may be controlled by the kind and the amount of the conductive agent added, which are described later.

The volume resistivity may be measured in the following manner. The volume resistivity may be measured by using a circular electrode (for example, "UR Probe" of Hiresta-IP, available from Mitsubishi Petro-Chemical Co., Ltd.) according to JIS K6911. The measurement method of the volume resistivity is described with reference to the drawings. The measurement may be performed with the same device as in the measurement of the surface resistivity, provided that in the circular electrode shown in FIGS. 3A and 3B, a second voltage application electrode B' is used instead of the plate insulating material B used for measuring the surface resistivity. The belt T is held between the cylindrical column electrode C and the cylindrical ring electrode D of the first voltage application electrode A and the second voltage application electrode B', and the electric current I (A) flowing upon application of a voltage V (V) between the cylindrical column electrode C of the first voltage application electrode A and the second voltage application electrode B' is measured. The volume resistivity ρv (Ω·cm) of the belt T is calculated according to the following expression, wherein t represents the thickness of the belt T.

$$\rho v = 19.6 \times (V/I) \times t$$

In the measurement of the volume resistivity, the electric current after applying a voltage of 500 V for 10 seconds in an environment of 22° C. and 55% RH is measured by using a circular electrode ("UR Probe" of Hiresta-IP, available from Mitsubishi Petro-Chemical Co., Ltd., outer diameter of cylindrical column electrode C: 16 mm, inner diameter of cylindrical ring electrode D: 30 mm, outer diameter of cylindrical ring electrode D: 40 mm).

The numerical value 19.6 appearing in the aforementioned expression is the electrode coefficient for converting to resistivity, which is calculated as $\pi d^2/4t$ from the outer diameter d (mm) of the circular column electrode and the thickness t (cm) of the sample. The thickness of the belt T may be measured by using an eddy-current film thickness meter, CTR-1500E, available from Sanko Electronics Co., Ltd.

A production method of the endless belt 101 according to the exemplary embodiment will be described.

A production method of the endless belt 101 having a structure that contains a polyimide resin as the resin material of the substrate layer 122 and contains carbon black as a conductive agent in the substrate layer 122 and the outermost layer 121 is described, but the production method is not limited thereto.

A core material is prepared. Examples of the core material used include a cylindrical metal mold. Examples of the material for the core material include a metal, such as aluminum, stainless steel and nickel. The length of the core material is necessarily equal to or longer than the width of the target endless belt, and may be longer by from approximately 10% to approximately 40% than the width of the target endless belt.

As a coating composition for forming the substrate layer, a polyamic acid solution containing carbon black dispersed therein is prepared.

Specifically, for example, a tetracarboxylic dianhydride and a diamine compound are dissolved in an organic polar solvent, in which carbon black is dispersed, and then the tetracarboxylic dianhydride and the diamine compound are polymerized, thereby preparing a polyamic acid solution containing carbon black dispersed therein.

In this process, the monomer concentration (the concentration of the tetracarboxylic dianhydride and the diamine compound in the solvent) in the polyamic acid solution may be determined in consideration of various conditions, and may be from approximately 5 to approximately 30% by mass. The polymerization temperature may be approximately 80° C. or less, and preferably from approximately 5° C. to approximately 50° C., and the polymerization time may be from approximately 5 hours to approximately 10 hours.

The coating composition for forming the substrate layer is then coated on the cylindrical metal mold as the core material, thereby forming a coated film of the coating composition for forming the substrate layer.

The coating method of the coating composition on the cylindrical metal mold is not particularly limited, and examples of the coating method include a method of dipping the outer surface of the cylindrical metal mold in the coating composition, a method of coating the coating composition on the inner surface of the cylindrical metal mold, and a method of coating the coating composition on the outer surface or the inner surface of the cylindrical metal mold while rotating the mold with the axis thereof directed horizontally by a spiral coating method or a die coating method.

The coated film of the coating composition for forming the substrate layer is then dried to form a film to be the substrate layer (i.e., the dried film before imidation). The drying condition may be, for example, a temperature of from approximately 80° C. to approximately 200° C. for a period of from approximately 10 minutes to approximately 60 minutes, and the higher the temperature is the shorter the heating time is. It may be effective to blow hot air upon heating. In the heating operation, the temperature may be increased stepwise or may be increased constantly. The core material may be disposed to make the axial direction of the core material in the horizontal direction, and may be rotated at a rate of from approximately 5 rpm to approximately 60 rpm. After drying, the core material may be disposed vertically.

As a coating composition for forming the outermost layer, a mixed solution containing a polyamic acid, a fluorinated polyamic acid, fluorine resin particles and carbon black is prepared.

Specifically, a tetracarboxylic dianhydride and a diamine compound are dissolved in an organic polar solvent, in which carbon black is dispersed, and then the tetracarboxylic dianhydride and the diamine compound are polymerized, thereby preparing a polyamic acid solution containing carbon black dispersed therein.

Separately, a tetracarboxylic dianhydride and a diamine compound are dissolved in an organic polar solvent, in which fluorine resin particles and depending on necessity a dispersant (a fluorine graft polymer) are dispersed, and then the tetracarboxylic dianhydride and the diamine compound are polymerized, thereby preparing a fluorinated polyamic acid solution containing the fluorine resin particles dispersed therein.

The polyamic acid solution containing carbon black dispersed therein and the fluorinated polyamic acid solution containing the fluorine resin particles dispersed therein are mixed, thereby preparing the mixed solution as the coating composition for forming the outermost layer.

The monomer concentration, the polymerization reaction temperature and the polymerization reaction time in the mixed solution may be the same as those for the polyamic acid solution as the coating composition for forming the substrate layer.

The carbon black is dispersed in the polyamic acid solution (i.e., a non-fluorinated polyamic acid solution) in advance, whereas the fluorine resin particles are dispersed in the fluorinated polyamic acid solution, thereby obtaining the dispersibility of both the carbon black and the fluorine resin particles, and thus decrease of the resistance of the outermost layer 121 and fluctuation of the resistance due to thinning of the film are prevented.

It is considered that this is because carbon black tends to be aggregated upon dispersing in a fluorinated polyamic acid solution as compared to a polyamic acid solution (i.e., a non-fluorinated polyamic acid solution).

The coating composition for forming the outermost layer is then coated on the film to be the substrate layer, thereby forming a coated film of the coating composition for forming the outermost layer.

The coating method of the coating composition on the cylindrical metal mold is not particularly limited, and examples of the coating method include those exemplified for the coating method of the coating composition for forming the substrate layer.

The coated film of the coating composition for forming the outermost layer is then dried to form a film to be the outermost layer (i.e., the dried film before imidation). The drying condition may be the same as those for the coated film of the coating composition for forming the substrate layer.

The films to be the substrate layer and the outermost layer are then subjected to an imidation treatment (baking), and then the films are removed from the core material. According to the operation, the endless belt 101 having a multilayer structure containing the substrate layer 122 and the outermost layer 121 is obtained.

The treating (baking) condition for imidation may be, for example, a heating temperature of from approximately 250° C. to approximately 450° C. (and preferably from approximately 300° C. to approximately 350° C.) for a period of from approximately 20 minutes to approximately 60 minutes, thereby performing imidation for forming a film of a polyimide resin. Upon heating, the temperature may be slowly increased stepwise or constantly until reaching the final temperature.

The films to be the substrate layer 122 and the outermost layer 121 may be subjected to the imidation treatment (baking) simultaneously from the standpoint of adhesion between the substrate layer 122 and the outermost layer 121, but the film to be the substrate layer may be subjected to the imidation treatment (baking) to form the substrate layer, and the coating composition for forming the outermost layer is then coated thereon, followed by forming the outermost layer.

The endless belt 101 according to the exemplary embodiment has a multilayer structure containing two layers, i.e., the substrate layer 122 and the outermost layer 121, but the structure thereof is not limited thereto and may be any structure that has an outermost layer 121 containing a polyimide resin, a fluorinated polyimide resin and fluorine resin particles. Examples of the structure include structures including two or more layers, such as a structure having an intermediate layer provided between the outermost layer 121 and the substrate layer 122, and a structure having the substrate layer 122 that is constituted by a multilayer structure including two or more layers.

The endless belt 101 according to the exemplary embodiment may have a single layer structure having a layer containing a polyimide resin, a fluorinated polyimide resin and fluorine resin particles.

Tubular Article Unit

Figure 4:
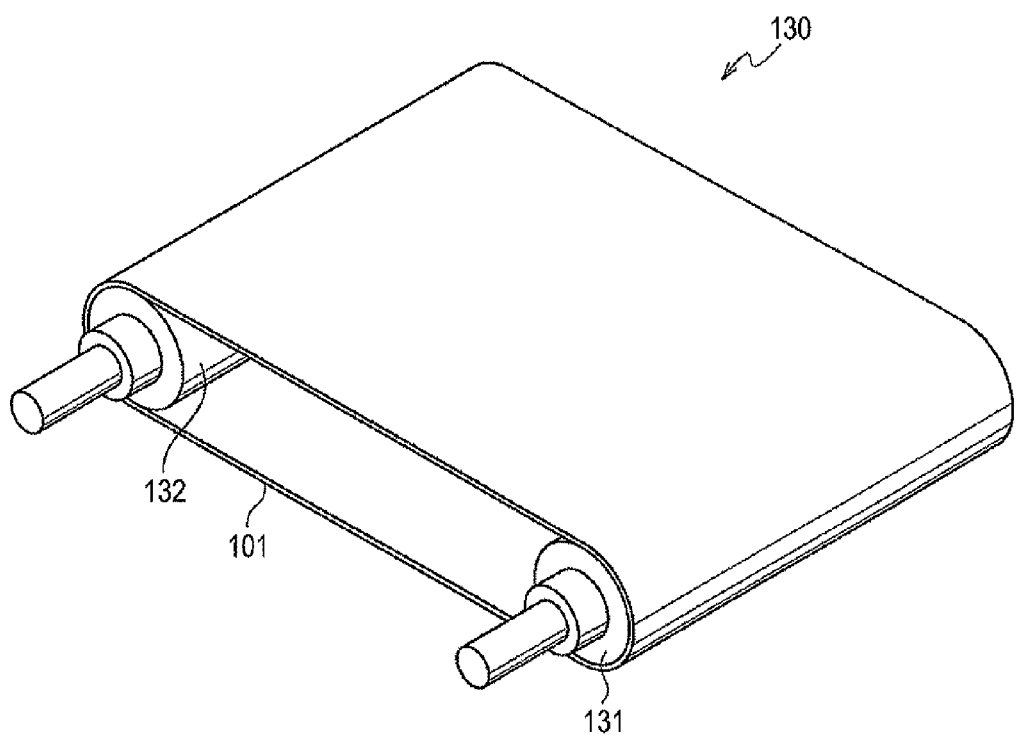
FIG. 4 is a schematic perspective view showing an example of a tubular article unit according to an exemplary embodiment of the invention.

FIG. 4 is a schematic perspective view showing a tubular article unit according an exemplary embodiment of the invention.

A tubular article unit (which may be hereinafter referred to as an endless belt unit) 130 according to the exemplary embodiment contains an endless belt 101 according to the exemplary embodiment, and the endless belt 101 is stretched between a driving roll 131 and a driven roll 132, which are disposed opposite to each other, under application of tension (which may be hereinafter referred to as "stretched under tension"), as shown in FIG. 4.

In the case where the endless belt unit 130 according to the exemplary embodiment is applied to an intermediate transfer material, the rolls for stretching the endless belt 101 under tension may be a roll for primarily transferring a toner image on a photoconductor (image holding member) to the endless belt 101 and a roll for secondarily transferring the toner image having been transferred to the endless belt 101 to a recording medium.

The number of rolls for stretching the endless belt 101 under tension is not limited, and the rolls may be disposed according to the mode of use thereof. The endless belt unit 130 having the aforementioned structure may be installed in an apparatus, and the endless belt 101 is rotated according to the rotation of the driving roll 131 and the driven roll 132 while being stretched on the rolls under tension.

Image Forming Apparatus

An image forming apparatus according to the exemplary embodiment contains an image holding member, a charging unit that charges the surface of the image holding member, a latent image forming unit that forms a latent image on the surface of the image holding member, a developing unit that develops the latent image with a toner to form a toner image, a transferring unit that transfers the toner image to a recording medium, and a fixing unit that fixes the toner image to the recording medium, in which the transfer unit has the endless belt according to the exemplary embodiment.

Specifically, in the image forming apparatus according to the exemplary embodiment, for example, the transfers g unit contains an intermediate transfer material, a primary transferring unit that primarily transfers the toner image having been formed on the image holding member to the intermediate transfer material, and a secondary transferring unit that secondarily transfers the toner image having been transferred to the intermediate transfer material to the recording medium, in which the image forming apparatus has the endless belt according to the exemplary embodiment as the intermediate transfer material.

In the image forming apparatus according to the exemplary embodiment, for example, the transferring unit contains a transporting transfer material (transporting transfer belt) and a transferring unit that transfers the toner image having been formed on the image holding member to the recording medium that is transported with a recording medium transferring material, in which the image forming apparatus has the endless belt according to the exemplary embodiment as the recording medium transferring material.

Examples of the image forming apparatus according to the exemplary embodiment include an ordinary monochrome image forming apparatus having only a monochrome toner contained in a developing device, a color image forming apparatus, in which toner images held on an image holding member are repeatedly primarily transferred sequentially to an intermediate transfer material, and a tandem color image forming apparatus, in which plural image holding members, which are equipped with developing devices of respective colors, are disposed in series on an intermediate transfer material.

Figure 5:
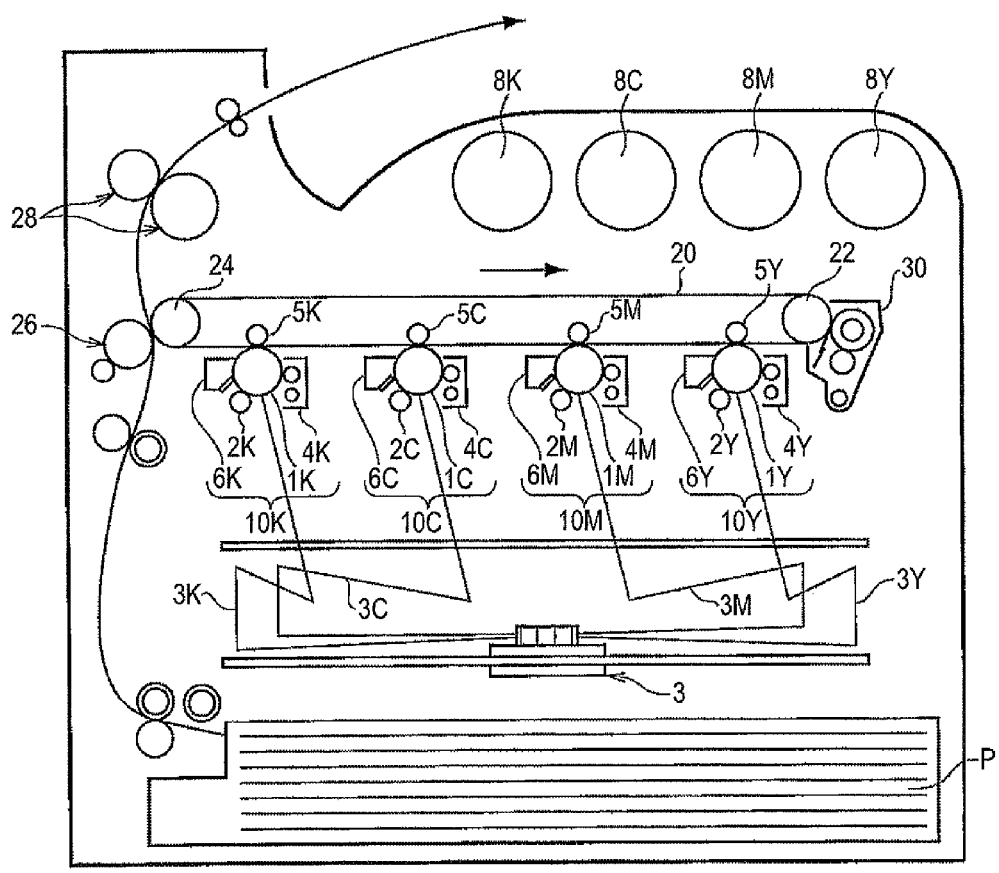
FIG. 5 is a schematic structural view showing an example of an image forming apparatus according to an exemplary embodiment of the invention.
Figure 6:
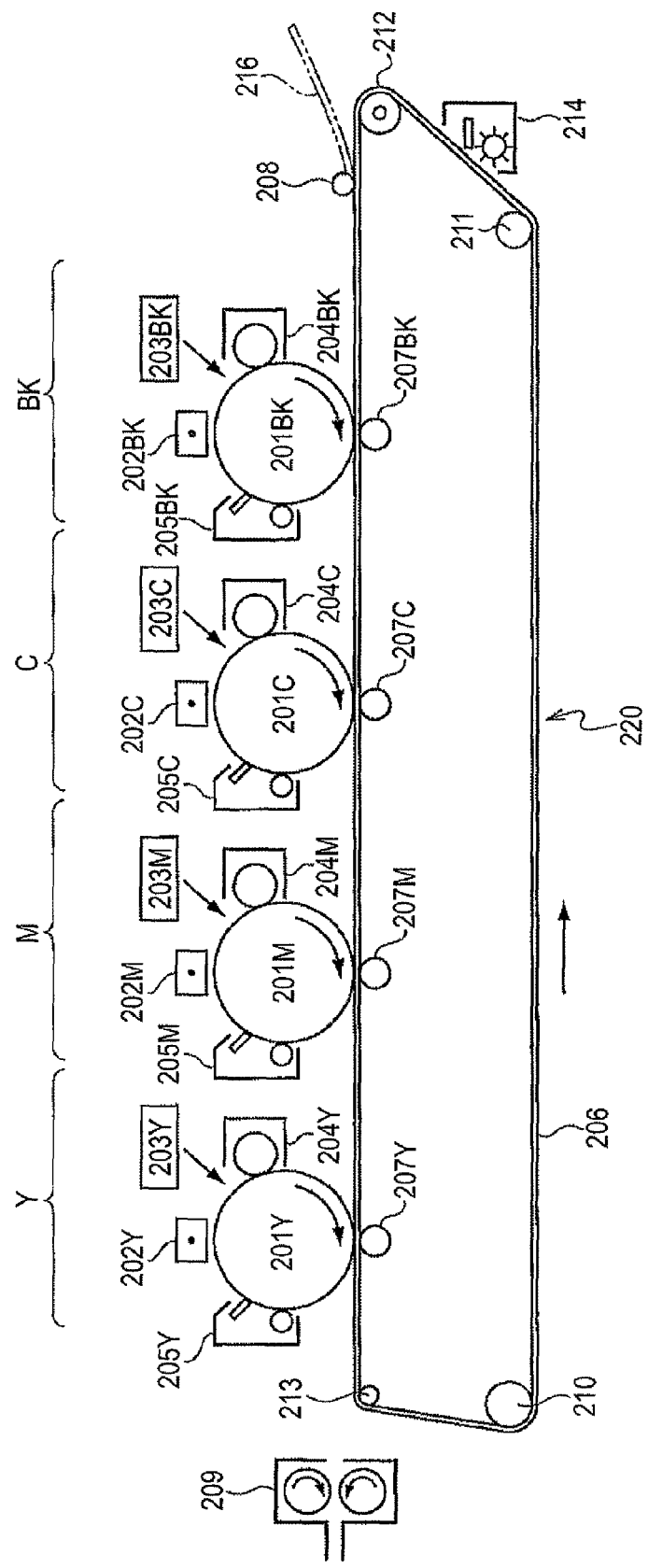
FIG. 6 is a schematic structural view showing an example of an image forming apparatus according to another exemplary embodiment of the invention.

An image forming apparatus according to the exemplary embodiment will be described with reference to the drawings. FIG. 5 is a schematic structural view showing an image forming apparatus according to an exemplary embodiment, and FIG. 6 is a schematic structural view showing an image forming apparatus according to another exemplary embodiment. The image forming apparatus shown in FIG. 5 has an intermediate transfer material (intermediate transfer belt), and the image forming apparatus shown in FIG. 6 has a recording medium transporting transfer material (recording medium transporting transfer belt).

The image forming apparatus shown in FIG. 5 has first to fourth image forming units 10Y, 10M, 100 and 10K (image forming devices) of the electrophotographic system, each of which outputs images of respective colors, yellow (Y), magenta (M), cyan (C) and black (K) based on the color-separated image data. The image forming units (which may be hereinafter referred simply to "units") 10Y, 10M 10C and 10K are disposed serially in the horizontal direction with prescribed distances. The units 10Y, 10M, 10C and 10K may be process cartridges that may be detached to the image forming apparatus.

An intermediate transfer belt 20 as an intermediate transfer material is extended on the upper side in the figure of the units 10Y, 10M, 10C and 10K and disposed to penetrate through the units. The intermediate transfer belt 20 is stretched under tension by winding on a driving roll 22 and a supporting roll 24 in contact with the inner surface of the intermediate transfer belt 20, and the rolls are disposed with a space between them in the horizontal direction in the figure. The intermediate transfer belt 20 runs in the direction of from the first unit 10Y toward the fourth unit 10K, thereby constituting a transferring unit of the image forming apparatus.

The supporting roll 24 is pushed with a spring or the like, which is not shown in the figure, in the direction away from the driving roll 22, and a prescribed tension is applied to the intermediate transfer belt 20 wound on the rolls. An intermediate transfer material cleaning device 30 is disposed to face the driving roll 22 on the side of the intermediate transfer belt 20 facing the image holding members.

Toners of four colors, yellow, magenta, cyan and black, contained in toner cartridges 8Y, 8M, 8C and 8K are supplied to developing devices (developing units) 4Y, 4M, 4C and 4K of the units 10Y, 10M, 100 and 10K, respectively.

The first to fourth units 10Y, 10M, 100 and 10K have the equivalent structure, and therefore, the first unit 10Y, which forms a yellow image and is disposed on the upstream side in the running direction of the intermediate transfer belt, is described as a representative. Descriptions for the second to fourth units 10M, 100 and 10K are omitted herein since the descriptions are equivalent to the description for the first unit 10Y provided that the symbols M (magenta), C (cyan) or K (black) is applied instead of Y (yellow) attached to the components constituting the first unit 10Y.

The first unit 10Y has a photoconductor 1Y functioning as an image holding member. Around the photoconductor 1Y, a charging roll 2Y that charges the surface of the photoconductor 3Y to a prescribed potential, an exposing device 3 that exposes the charged surface with laser light 3Y based on the color-separated image signal to form an electrostatic latent image, a developing device (developing unit) 4Y that develops the electrostatic latent image by supplying a charged toner to the electrostatic latent image, a primary transfer roll 5Y (primary transfer unit) that transfers the toner image thus developed to the intermediate transfer belt 20, and a photoconductor cleaning device (cleaning unit) 6Y that removes with a cleaning blade the toner remaining on the surface of the photoconductor 1Y after the primary transfer are disposed in this order.

The primary transfer roll 5Y is disposed inside the intermediate transfer belt 20 and is provided at the position facing the photoconductor 1Y. The primary transfer rolls 5Y, 5M, 5C and 5K are connected to a bias power sources (which are not shown in the figure), respectively, that each apply the primary transfer bias voltage thereto. The bias power sources each vary the transfer bias voltage applied to the primary transfer roll by a controller, which is not shown in the figure.

The operation of the first unit 10Y forming a yellow image will be described. Before starting the operation, the surface of the photoconductor 1Y is charged to a potential of from approximately −800 V to approximately −600 V with the charging roll 2Y.

The photoconductor 1Y has an electroconductive substrate (volume resistivity at 20° C.: $1\times10^6 \Omega\cdot cm$ or less) and a photoconductor layer formed thereon. The photoconductor layer has high resistance (which is equivalent to resistance of an ordinary resin) in the normal state, and has such a property that a portion that is irradiated with laser light 3Y is changed in specific resistance. The laser light 3Y is output from the exposing device 3 onto the surface of the charged photoconductor 1Y according to the yellow image data sent from the controller, which is not shown in the figure. The photoconductor layer on the surface of the photoconductor 1Y is irradiated with the laser light 3Y, thereby forming an electrostatic image in a yellow printing pattern on the surface of the photoconductor 1Y.

The electrostatic image is an image that is formed on the surface of the photoconductor 1Y with charge, and is a negative image formed in such a mechanism that the portion of the photoconductor layer that is irradiated with the laser light 3Y is decreased in specific resistance, where the charge on the surface of the photoconductor 1Y flows off, whereas the charge remains in the portion that is not irradiated with the laser light 3Y.

The electrostatic image thus formed on the photoconductor 1Y is rotated to the prescribed developing position according to the movement of the photoconductor 1Y. The electrostatic image on the photoconductor 1Y is converted at the developing position to a visualized image (developed image) with the developing device 4Y.

The developing device 4Y houses, for example, a yellow toner. The yellow toner is frictionally charged by agitating inside the developing device 4Y and is held on a developer roll (developer holding member) owing to the charge thereof with the same polarity (negative polarity) as the charge on the photoconductor 1Y. Upon passing the surface of the photoconductor 1Y through the developing device 4Y, the yellow toner is electrostatically attached to the destaticized portion of the latent image on the surface of the photoconductor 1Y, thereby developing the latent image with the yellow toner. The photoconductor 1Y having the toner image of the yellow toner is further moved at the prescribed velocity, and the toner image thus developed on the photoconductor 1Y is transported to the prescribed primary transfer position.

After transporting the yellow toner image on the photoconductor 1Y to the primary transfer position, the prescribed primary transfer bias voltage is applied to the primary transfer roll 5Y, and an electrostatic force in the direction from the photoconductor 1Y toward the primary transfer roll 5Y is applied to the toner image, thereby transferring the toner image from the photoconductor 1Y to the intermediate transfer belt 20. The transfer bias voltage applied herein has a positive polarity (+), which is reverse to the polarity of the toner (−), and is controlled, for example in the first unit 10Y, to approximately +10 μA with a controller, which is not shown in the figure.

The toner remaining on the photoconductor 1Y is removed and recovered with the cleaning device 6Y.

The primary transfer bias voltages applied to the primary transfer rolls 5M, 5C and 5K of the second unit 10M and later are also controlled similarly to the first unit 10Y.

The intermediate transfer belt 20 thus having the yellow toner image transferred thereto in the first unit 10Y is then transported through the second to fourth units 10M, 10C and 10K in this order, and the toner images of the respective colors are transferred and accumulated thereon.

The intermediate transfer belt 20 having the toner images of the four colors transferred multiply thereto with the first to fourth units then reaches the secondary transfer part constituted by the intermediate transfer belt 20, a supporting roll 24 in contact with the inner surface of the intermediate transfer belt 20, and a secondary transfer roll (secondary transfer unit) 26 disposed to face the image-holding surface of the intermediate transfer belt 20. Separately, a recording medium P is supplied with a supplying mechanism to the gap between the secondary transfer roll 26 and the intermediate transfer belt 20, which are pressed to each other, at the prescribed timing, and the prescribed secondary transfer bias voltage is applied to the supporting roll 24. The transfer bias voltage applied herein has the same polarity (−) as the polarity of the toner (−), and an electrostatic force in the direction from the intermediate transfer belt 20 toward the recording medium P is applied to the toner image, thereby transferring the toner image from the intermediate transfer belt 20 to the recording medium P. The secondary transfer bias voltage applied herein is determined according to the resistance of the secondary transfer part detected with a resistance detecting unit, which is not shown in the figure, and is controlled in terms of voltage.

Thereafter, the recording medium P is sent to the fixing device (fixing unit) 28, in which the toner image having multiple colors is fused by heating and thus fixed to the recording medium P. The recording medium P having the color image thus fixed thereon is then delivered to the delivery part, and thus the color image formation operation is completed.

The image forming apparatus exemplified in this exemplary embodiment has a structure that a toner image is transferred to the recording medium P through the intermediate transfer belt 20, but the structure is not limited thereto, and such a structure may be employed that a toner image is transferred from a photoconductor directly to a recording medium P.

The image forming apparatus shown in FIG. 6 has image forming units Y, M, C and BK having photoconductor drums 201Y, 201M, 201C and 201BK, respectively, which are rotatable in the clockwise direction shown by the arrow at the prescribed circumferential velocity (process speed). Around the photoconductor drums 201Y, 201M, 201O and 201BK, charging rolls 202Y, 202M, 202C and 202BK, exposing devices 203Y, 203M, 203C and 203BK, developing devices of respective colors (i.e., a yellow developing device 204Y, a magenta developing device 204M, a cyan developing device 204C and a black developing device 204BK), and photoconductor drum cleaning members 205Y, 205M, 205C and 205BK are disposed, respectively.

The image forming units Y, M, C and BK are disposed serially along a recording medium transporting transfer belt 206 in the order of the image forming units BK, C, M and Y, and the order of the image forming units may be appropriately determined depending on the image forming method, for example, the order of the image forming units BK, Y, C and M.

The recording medium transporting transfer belt 206 is stretched on belt supporting rolls 210, 211, 212 and 213 on the inner surface thereof, thereby constituting a transferring unit of the image forming apparatus. The recording medium transporting transfer belt 206 is rotatable in the anticlockwise direction shown by the arrow at the same circumferential velocity as the photoconductor drums 201Y, 201M, 201C and 201BK, and is disposed in such a manner that the part of the recording medium transporting transfer belt 206 between the belt supporting rolls 212 and 213 is in contact with each of the photoconductor drums 201Y, 201M, 201O and 201BK, respectively. The recording medium transporting transfer belt 206 is equipped with a belt cleaning member 214.

Transfer rolls 207Y, 207M, 207C and 207BK are disposed inside the recording medium transporting transfer belt 206 and face the positions where the recording medium transporting transfer belt 206 is in contact with the photoconductor drums 201Y, 201M, 201O and 201BK, respectively, thereby constituting transferring regions where toner images are transferred to a recording medium 216 through the photoconductor drums 201Y, 201M, 201O and 201BK and the recording medium transporting transfer belt 206. The transfer rolls 207Y, 207M, 207C and 207BK may be disposed immediately beneath the photoconductor drums 201Y, 201M, 201O and 201BK, respectively, or may be disposed at positions deviated therefrom, respectively.

A fixing device 209 is disposed in such a manner that the recording medium 216 is to be transported thereto after passing through the transferring regions between the recording medium transporting transfer belt 206 and the photoconductor drums 201Y, 201M, 201C and 201BK, respectively.

The recording medium 216 is transported to the recording medium transporting transfer belt 206 with a recording medium feed roll 208.

In the image forming unit BK, the photoconductor drum 201BK is rotated. The charging roll 202BK is rotated according to the rotation of the photoconductor drum 201BK, thereby charging the surface of the photoconductor drum 201BK to the prescribed polarity and potential. The photoconductor drum 201BK having the surface thus charged is then exposed imagewise with the exposing device 203BK, thereby forming an electrostatic latent image on the surface thereof.

Subsequently, the electrostatic latent image is developed with the black developing device 204BK, and thus a toner image is formed on the surface of the photoconductor drum 201BK. The developer used herein may be a one-component developer or a two-component developer.

The toner image passes through the transferring region between the photoconductor drum 201BK and the recording medium transporting transfer belt 206. The recording medium 216 is electrostatically attached to the recording medium transporting transfer belt 206 and transported thereby to the transferring region, in which the toner image is sequentially transferred to the surface of the recording medium 216 with the electric field formed by the transfer bias voltage applied from the transfer roll 207BK.

Thereafter, the toner remaining on the photoconductor drum 201BK is cleaned and removed with the photoconductor drum cleaning member 205BK. The photoconductor drum 201BK is then started to the next image formation.

The image formation process is performed also in the image forming units C, M and Y according to the aforementioned method.

The recording medium 216 having the toner images transferred by the transfer rolls 207BK, 207C, 207M and 207Y is transported to the fixing device 209, in which the toner images are fixed to the recording medium 216.

Thus, an image is formed on the recording medium.

EXAMPLES

The invention will be described in more detail with reference to examples below, but the invention is not limited to the examples.

Example 1

Preparation of Coating Composition for Forming Substrate Layer

Carbon black (Special Black 4, available from Evonic Degussa Japan Co., Ltd.) in an amount of 8% by mass in terms of solid content is added to a polyamic acid N-methyl-2-pyrrolidone (NMP) solution containing biphenyltetracarboxylic dianhydride (BPDA) and p-phenylenediamine (PDA) (U Imide KX, available from Unitika, Ltd., concentration of solid content: 20% by mass), and dispersed therein (200 N/mm², 5 passes) with a jet-mill dispersing apparatus (Geanus PY, available from Geanus Co., Ltd.). The polyamic acid solution containing carbon black dispersed therein is filtered through a stainless steel mesh of 20 µm to remove foreign matters and aggregates of the carbon black. The solution is then deaerated in vacuum under stirring for 15 minutes, thereby providing the final solution, which is designated as a coating composition for forming a substrate layer.

Preparation of Coating Composition for Forming Outermost Layer

Preparation of Polyamic Acid Solution Having Carbon Black Dispersed Therein

Carbon black (Special Black 4, available from Evonic Degussa Japan Co., Ltd.) in an amount of 15% by mass in terms of solid content is added to a polyamic acid N-methyl-2-pyrrolidone (NMP) solution containing biphenyltetracarboxylic dianhydride (BPDA) and p-phenylenediamine (PDA) (U Imide KX, available from Unitika, Ltd., concentration of solid content: 20% by mass), and dispersed therein (200 N/mm², 5 passes) with a jet-mill dispersing apparatus (Geanus PY, available from Geanus Co., Ltd.). The polyamic acid solution containing carbon black dispersed therein is filtered through a stainless steel mesh of 20 µm to remove foreign matters and aggregates of the carbon black. The solution is then deaerated in vacuum under stirring for 15 minutes, thereby providing the final solution.

Preparation of Polyamic Acid Solution Having Fluorine Resin Particles Dispersed Therein A fluorinated polyamic acid N-methyl-2-pyrrolidone (NMP) solution containing 1,4-bis(3,4-dicarboxytrifluorophenoxy)tetrafluorobenzene dianhydride (10FEDA) and 1,3-diamino-2,4,5,6-tetrafluorobenzene (4FMPD) is prepared.

The fluorinated polyamic acid solution (concentration of solid content: 20% by mass) is then mixed with a polyamic acid N-methyl-2-pyrrolidone (NMP) solution containing biphenyltetracarboxylic dianhydride (BPDA) and p-phenylenediamine (PDA) (U Imide KX, available from Unitika, Ltd., concentration of solid content: 20% by mass) at a ratio of 1/3.

To the mixed solution, PTFE resin particles having a primary particle diameter of 0.2 µm in an amount of 50% by mass in terms of solid content and a fluorine resin particle dispersant (S-386, available from AGC Seimi Chemical Co., Ltd.) in an amount of 2% by mass are added, and dispersed therein (200 N/mm², 5 passes) with a jet-mill dispersing apparatus (Geanus PY, available from Geanus Co., Ltd.).

The polyamic acid solution containing fluorine resin particles dispersed therein is filtered through a stainless steel mesh of 20 µm to remove foreign matters and aggregates of the PTFE resin particles. The solution is then deaerated in vacuum under stirring for 15 minutes, thereby providing the final solution.

Preparation of Mixed Solution 500 parts by mass of the polyamic acid solution having carbon black dispersed therein and 500 parts by mass of the polyamic acid solution having fluorine resin particles dispersed therein are mixed with a rotary mixing apparatus, thereby preparing a mixed solution, which is designated as a coating composition for forming an outermost layer.

Production of Endless Belt

A cylinder made of a stainless steel material (SUS304) having an outer diameter of 600 mm, a thickness of 8 mm and a length of 900 mm is prepared, and supporting plates made of the same stainless steel material each having a thickness of 8 mm and an outer diameter capable of invaginating into the cylinder with four vent holes having a diameter of 150 mm are fit into both ends of the cylinder, followed by welding, thereby preparing a core material. The outer surface of the core material is roughened to Ra 0.4 µm by a blasting treatment with alumina particles.

A silicone releasing agent (Sepacoat, a trade name, available from Shin-Etsu Chemical Co., Ltd.) is coated on the outer surface of the core material and baked at 300° C. for 1 hour.

The coating composition for forming a substrate layer is coated on the outer surface of the core material to form a film of the coating composition for forming the first layer.

The coating composition for forming the substrate layer is coated by a spiral coating method.

The coating operation is performed in the following manner. The coating composition for forming a substrate layer is discharged at a rate of 20 mL per minute from a nozzle of a liquid falling apparatus having a container containing 15 L of the coating composition for forming a substrate layer connected to a mohno pump. The core material is rotated at 20 rpm, and after attaching the discharged coating composition for forming a substrate layer to the core material, a blade is pressed onto the surface of the core material and moved in the axial direction of the core material at a velocity of 210 mm/min. The blade used herein is a stainless steel plate having a thickness of 0.2 mm processed to have a width of 20 mm and a length of 50 mm. The coated area is from the position inside by 10 mm in the axial direction of the core material from one end thereof to the position inside by 10 mm from the other end thereof. After coating, the core material is continuously rotated for 5 minutes, and then the spiral pattern on the surface of the coated film disappears.

Thus, a coated film of the coating composition for forming a substrate layer having a thickness of 160 µm is formed. The thickness corresponds to a final thickness of 33 µm.

Thereafter, the core material is placed in a drying oven at 180° C. while rotating at 10 rpm for drying the coated film of the coating composition for forming a substrate layer for 20 minutes. Thus, a film to be a substrate layer is formed.

The coating composition for forming an outermost layer is then coated on the outer surface of the film to be a substrate layer, thereby forming a coated film of the coating composition for forming an outermost layer.

The coating composition for forming an outermost layer is coated in the same manner as the coating operation of the coating composition for forming a substrate layer, provided that the discharge rate of the coating composition from the nozzle is 40 mL per minute. The coated area is from the position inside by 10 mm in the axial direction of the core material from one end thereof to the position inside by 10 mm from the other end thereof. After coating, the core material is continuously rotated for 5 minutes, and then the spiral pattern on the surface of the coated film disappears.

Thus, a coated film of the coating composition for forming an outermost layer having a thickness of 300 µm is formed. The thickness corresponds to a final thickness of 67 µm.

Thereafter, the core material is placed in a drying oven at 185° C. while rotating at 10 rpm for drying the coated film of the coating composition for forming an outermost layer for 30 minutes. Thus, a film to be an outermost layer is formed.

The core material is set down from the turntable, and is placed vertically and subjected to heat reaction at 200° C. for 30 minutes and 300° C. for 30 minutes in a heating furnace, whereby the films to be a substrate layer and an outermost layer are dried for removing the remaining solvent and simultaneously subjected to imidation reaction.

Thereafter, the laminated structure formed of a substrate layer and an outermost layer is withdrawn from the core material, thereby providing an endless belt.

The endless belt is cut at the center in the width direction, and unnecessary portions are cut from both ends thereof, thereby providing two endless belts having a width of 360 mm. The thickness of the endless belt is measured with a dial gauge at 50 positions, i.e., 5 positions in the axial direction and 10 positions in the circumferential direction, and as a result, the average total thickness is 100 μm.

Example 2

An endless belt is produced in the same manner as in Example 1 except that in the preparation of the polyamic acid solution containing fluorine resin particles dispersed therein in Example 1, the fluorinated polyamic acid solution (concentration of solid content: 20% by mass) and the polyamic acid solution (U Imide KX, available from Unitika, Ltd., concentration of solid content: 20% by mass) are mixed at a ratio of 1/1.

Example 3

An endless belt is produced in the same manner as in Example 1 except that in the preparation of the polyamic acid solution containing fluorine resin particles dispersed therein in Example 1, PFA resin particles having a primary particle diameter of 0.2 μm are used instead of the PTFE resin particles.

Example 4

An endless belt is produced in the same manner as in Example 1 except that in the preparation of the polyamic acid solution containing fluorine resin particles dispersed therein in Example 1, 2,2-bis(3,4-dicarboxyphenyl)hexafluoropropane dianhydride (6FDA) is used instead of 1,4-bis(3,4-dicarboxytrifluorophenoxy)tetrafluorobenzene dianhydride (10FEDA), and 2,2'-bis(trifluoromethyl)-4,4'-diaminobiphenyl (TFDB) is used instead of 1,3-diamino-2,4,5,6-tetrafluorobenzene (4FMPD).

Comparative Example 1

An endless belt is produced in the same manner as in Example 1 except that in the preparation of the polyamic acid solution containing fluorine resin particles dispersed therein in Example 1, the fluorinated polyamic acid solution is not used as the polyamic acid component, but only a polyamic acid N-methyl-2-pyrrolidone (NMP) solution containing biphenyltetracarboxylic dianhydrideand (BPDA) p-phenylenediamine (PDA) (U Imide KX, available from Unitika, Ltd., concentration of solid content: 20% by mass) is used.

Example 5

In the preparation of the polyamic acid solution containing carbon black dispersed therein in Example 1, the PTFE resin particles are used instead of carbon black and dispersed in the same manner as in the preparation of the polyamic acid solution containing fluorine resin particles dispersed therein in Example 1, thereby preparing a solution. Separately, in the preparation of the polyamic acid solution containing fluorine resin particles dispersed therein in Example 1, carbon black is used instead of the PTFE resin particles and dispersed in the same manner as in the preparation of the polyamic acid solution containing carbon black dispersed therein in Example 1, thereby preparing a solution.

An endless belt is produced in the same manner as in Example 1 except that the two solutions are used for preparing a mixed solution as a coating composition for forming an outermost layer.

Example 6

An endless belt is produced in the same manner as in Example 1 except that in the preparation of the coating composition for forming a substrate layer in Example 1, a polyamideimide resin solution (Vylomax 16NN, available from Toyobo Co., Ltd., solvent: N-methylpyrrolidone (NMP), solid content fraction: 17% by mass) is used instead of the polyamic acid N-methyl-2-pyrrolidone (NMP) solution (U Imide KX, available from Unitika, Ltd., concentration of solid content: 20% by mass).

Evaluation

The endless belts are evaluated in the following manner.

Voids in Outermost Layer

The voids in the outermost layer are observed in the following manner.

The outer surface of the endless belt is observed with an field emission scanning electron microscope (JSM 6700F, available from JEOL, Ltd.) at 18 positions, i.e., 6 positions in the circumferential direction and 3 positions in the axial direction, at an acceleration voltage of 5 kV and a magnitude of 20,000, and the occurrence of voids is evaluated by the following three grades.

G3: Voids are found around substantially all the fluorine resin particles in the outermost layer.

G2: Voids are slightly found in the outermost layer (within the tolerance level).

G1: No void is found in the outermost layer.

Dispersion State of Fluorine Resin Particles in Outermost Layer

The dispersion state of the fluorine resin particles in the outermost layer is evaluated in the following manner.

The outer surface of the endless belt is observed with an field emission scanning electron microscope (JSM 6700F, available from JEOL, Ltd.) at 18 positions, i.e., 6 positions in the circumferential direction and 3 positions in the axial direction, at an acceleration voltage of 5 kV and a magnitude of 20,000, and the dispersion state of the fluorine resin particles in the outermost layer is evaluated by the following three grades.

G3: Less than 90% of the fluorine resin particles are dispersed in the form of primary particles, and the maximum diameter of the secondary particles is 2 μm or more.

G2: Less than 90% of the fluorine resin particles are dispersed in the form of primary particles, and the maximum diameter of the secondary particles is less than 2 μm (within the tolerance level).

G1: 90% or more of the fluorine resin particles are dispersed in the form of primary particles.

Releasing Property of Outermost Layer

The releasing property of the outermost layer is evaluated in the following manner.

The outermost layer is measured for contact angle with water by using a water contact angle meter, DM-501, available from Kyowa Interface Science Co., Ltd.

The contact angle with water is evaluated by the following three grades.
G3: The contact angle with water is less than 90°.
G2: The contact angle with water is 90° or more and less than 100° (within the tolerance level).
G1: The contact angle with water is 100° or more.

Resistance Characteristics of Outermost Layer

The resistance characteristics of the outermost layer (decrease in resistance due to thinning of the film) are evaluated in the following manner.

The volume resistivity is measured in such manner that the electric current after applying a voltage of 500 V for 10 seconds in an environment of 22° C. and 55% RH is measured by using a circular electrode ("UR Probe" of Hiresta-IP, available from Mitsubishi Petro-Chemical Co., Ltd., outer diameter of cylindrical column electrode C: 16 mm, inner diameter of cylindrical ring electrode D: 30 mm, outer diameter of cylindrical ring electrode D: 40 mm), and the volume resistivity is calculated from the electric current.

The change in resistivity before and after printing 10,000 sheets in a full color multifunction machine (DocuColor 8000 Digital Press, available from Fuji Xerox Co., Ltd.) is calculated.

The change in resistivity is evaluated by the following three grades.
G3: The change in resistivity is 0.5 Log Ω·cm or more.
G2: The change in resistivity is 0.2 Log Ω·cm or more and less than 0.5 Log Ω·cm (within the tolerance level).
G1: The change in resistivity is less than 0.2 Log Ω·cm.

Peel-Off Property Between Substrate Layer and Outermost Layer

The peel-off property between the substrate layer and the outermost layer is evaluated in the following manner.

The endless belt is observed after printing 10,000 sheets in a full color multifunction machine (DocuColor 8000 Digital Press, available from Fuji Xerox Co., Ltd.), and the presence of peel-off is observed.

The peel-off property is evaluated by the following three grades.
G3: Clear peel-off with a width of 5 mm or more is found.
G2: Slight peel-off with a width of less than 5 mm is found (within the tolerance level).
G1: No peel-off is found.

Image Quality

The image quality is evaluated with the endless belt used as an intermediate transfer material (intermediate transfer belt) in the following manner.

The endless belt as an intermediate transfer material is installed in an image quality evaluation machine, which is provided by modifying a full color multifunction machine (DocuColor 8000 Digital Press, available from Fuji Xerox Co., Ltd.) having the basic structure shown in FIG. 5 in such a manner that the secondary transfer roll is cut away from the internal power source and connected to an external power source (Model 610D, available from TRek, Inc.), whereby a voltage is capable of being applied to the secondary transfer roll directly from the external power source. The transfer voltage applied to the secondary transfer roll upon printing is set to 4.0 kV. Minute white spots and transfer failure are evaluated with a cyan solid image (density: 100%), scaly density unevenness is evaluated with a cyan halftone image (density: 70%), and halftone unevenness is evaluated with a cyan halftone image (density: 30%). The image quality failure with the worst grade is designated as the evaluation grade of the endless belt.

The image quality is evaluated by the following three grades.
G3: Image quality failure conspicuously occurs beyond the tolerance level.
G2: Image quality failure occurs (within the tolerance level).
G1: No image quality failure occurs.

The features of the endless belts obtained in Examples and Comparative Examples are shown in Table 1, and the evaluation results thereof are shown in Table 2.

TABLE 1

| | Substrate layer Resin species | Outermost Layer Resin species | Fluorinated PI resin | Fluorine resin particles | Conductive agent | Fluorine resin particle dispersant | Note |
|---|---|---|---|---|---|---|---|
| Example 1 | PI resin (BPDA + PDA) | PI resin (BPDA + PDA) | Fluorinated PI resin (10FEDA + 4FMPD) | PTFE | CB | S-386 | A CB-dispersed polyamic acid solution (containing no fluorinated polyamic acid) and a fluorine resin particle-dispersed polyamic acid solution (containing fluorinated polyamic acid) are prepared in advance and then mixed to prepare a mixed solution, which is used as a coating composition for forming an outermost layer. |
| Example 2 | PI resin (BPDA + PDA) | PI resin (BPDA + PDA) | Fluorinated PI resin (10FEDA + 4FMPD) | PTFE | CB | S-386 | The proportion of the fluorinated PI resin is increased. |
| Example 3 | PI resin (BPDA + PDA) | PI resin (BPDA + PDA) | Fluorinated PI resin (10FEDA + 4FMPD) | PFA | CB | S-386 | PFA particles are used as the fluorine resin particles. |
| Example 4 | PI resin (BPDA + PDA) | PI resin (BPDA + PDA) | Fluorinated PI resin (6FDA + TFDB) | PTFE | CB | S-386 | A fluorinated PI resin with another structure is used. |
| Comparative Example 1 | PI resin (BPDA + PDA) | PI resin (BPDA + PDA) | none | PTFE | CB | S-386 | No fluorinated PI resin is used. |
| Example 5 | PI resin (BPDA + PDA) | PI resin (BPDA + PDA) | Fluorinated PI resin (10FEDA + 4FMPD) | PTFE | CB | S-386 | A CB-dispersed polyamic acid solution (containing fluorinated polyamic acid) and a fluorine resin particle-dispersed polyamic acid solution (containing no fluorinated polyamic acid) are prepared in advance and then mixed to prepare a |

TABLE 1-continued

| | Substrate layer Resin species | Outermost Layer Resin species | Fluorine resin particles | Conductive agent | Fluorine resin particle dispersant | Note |
|---|---|---|---|---|---|---|
| Example 6 | PAI resin | PI resin (BPDA + PDA) | Fluorinated PI resin (10FEDA + 4FMPD) | PTFE | CB | S-386 | mixed solution, which is used as a coating composition for forming an outermost layer. The substrate layer is constituted by PAI resin. |

PI resin: polyimide resin
Fluorinated PI resin: fluorinated polyimide resin
PAI resin: polyamideimide resin
CB: carbon black

TABLE 2

| | Voids in outermost layer | Dispersed state of fluorine resin particles in outermost layer | Releasing property of outermost layer | Resistance characteristics of outermost layer | Peel-off property between substrate layer and outermost layer | Image quality |
|---|---|---|---|---|---|---|
| Example 1 | G2 | G1 | G1 | G1 | G1 | G1 |
| Example 2 | G1 | G1 | G1 | G1 | G1 | G1 |
| Example 3 | G2 | G1 | G1 | G2 | G1 | G2 |
| Example 4 | G2 | G2 | G2 | G2 | G2 | G2 |
| Comparative Example 1 | G3 | G3 | G3 | G3 | G1 | G3 |
| Example 5 | G2 | G2 | G1 | G2 | G1 | G2 |
| Example 6 | G2 | G1 | G1 | G1 | G3 | G1 |

It is understood from the results that Examples provide good results for the voids in the outermost layer, the releasing property of the outermost layer and the image quality, as compared to Comparative Example. It is also understood that Examples provide good results for the wear property of the outermost layer equivalent to Comparative Example 1.

It is understood that Example 1, in which the imidation product of fluorinated polyamic acid having an ether group on the main chain thereof is used as the fluorinated polyimide resin, provides good results for the dispersion state of the fluorine resin particles in the outermost layer, the releasing property of the outermost layer, the wear property of the outermost layer and the image quality, as compared to Example 4, in which the fluorinated polyimide resin having no ether group on the main chain thereof is used.

It is understood that Example 1, in which the polyimide resin is used as the resin species of the substrate layer, provides good results for the peel-off property between the substrate layer and the outermost layer, as compared to Example 6, in which the other resin than a polyimide resin is used as the resin species of the substrate layer.

It is understood that Example 1, in which a polyamic acid solution containing carbon black dispersed therein (containing no fluorinated polyamic acid) and a polyamic acid solution containing fluorine resin particles dispersed therein (containing fluorinated polyamic acid) are prepared in advance and then mixed to prepare a mixed solution, which is used as the coating composition for forming an outermost layer, provides good results for the dispersed state of the fluorine resin particles in the outermost layer and the resistance characteristics of the outermost layer, as compared to Example 5, in which a polyamic acid solution containing fluorine resin particles dispersed therein (containing no fluorinated polyamic acid) and a polyamic acid solution containing carbon black dispersed therein (containing fluorinated polyamic acid) are prepared in advance and then mixed to prepare a mixed solution, which is used as the coating composition for forming an outermost layer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A tubular article comprising a layer containing a polyimide resin, a fluorinated polyimide resin and fluorine resin particles as an outermost layer.

2. The tubular article according to claim 1, wherein the fluorine resin particles are selected from primary particles, secondary particles having a secondary particle diameter of approximately 2 µm or less, and a mixed state thereof.

3. The tubular article according to claim 1, wherein the tubular article contains a multilayer structure having two or more layers, and an underlayer in contact with the outermost layer contains a polyimide resin.

4. The tubular article according to claim 1, wherein the layer has a thickness of from approximately 5 µm to approximately 70 µm.

5. The tubular article according to claim 1, wherein the content of the polyimide resin is from approximately 10% by mass to approximately 80% by mass based on the total components constituting the layer.

6. The tubular article according to claim 1, wherein the content of the fluorinated polyimide resin is from approximately 0.1% by mass to approximately 50% by mass based on the total components constituting the layer.

7. The tubular article according to claim 1, wherein the content of the fluorine resin particles is from approximately 1% by mass to approximately 50% by mass based on the total components constituting the layer.

8. The tubular article according to claim 1, wherein the content ratio of the fluorinated polyimide resin and the fluorine resin particles is from approximately 50:1 to approximately 1:500.

9. A tubular article unit comprising the tubular article according to claim 1, and plural rolls, on which the tubular article is stretched under tension, the tubular article unit being detachable to an image forming apparatus.

10. The tubular article unit according to claim 9, wherein the fluorine resin particles are selected from primary particles, secondary particles having a secondary particle diameter of approximately 2 μm or less, and a mixed state thereof.

11. The tubular article unit according to claim 9, wherein the tubular article contains a multilayer structure having two or more layers, and an underlayer in contact with the outermost layer contains a polyimide resin.

12. An intermediate transfer material comprising the tubular article according to claim 1.

13. The intermediate transfer material according to claim 12, wherein the fluorine resin particles are selected from primary particles, secondary particles having a secondary particle diameter of approximately 2 μm or less, and a mixed state thereof.

14. The intermediate transfer material according to claim 12, wherein the tubular article contains a multilayer structure having two or more layers, and an underlayer in contact with the outermost layer contains a polyimide resin.

15. The intermediate transfer material according to claim 12, wherein the outermost layer is provided on a substrate layer containing a polyimide resin.

16. An image forming apparatus comprising:
an image holding member;
a charging unit that charges a surface of the image holding member;
a latent image forming unit that forms a latent image on the surface of the image holding member;
a developing unit that develops the latent image on the surface of the image holding member with a toner to form a toner image;
an intermediate transfer material, on which the toner image formed on the surface of the image holding member is transferred, the intermediate transfer material comprising a tubular article comprising a layer containing a polyimide resin, a fluorinated polyimide resin and fluorine resin particles as an outermost layer;
a primary transferring unit that primarily transfers the toner image formed on the surface of the image holding member to a surface of the intermediate transfer material;
a secondary transferring unit that secondarily transfers the toner image transferred to the surface of the intermediate transfer material, to a recording medium; and
a fixing unit that fixes the toner image transferred to the recording medium.

17. The image forming apparatus according to claim 16, wherein the fluorine resin particles are selected from primary particles, secondary particles having a secondary particle diameter of approximately 2 μm or less, and a mixed state thereof.

18. The image forming apparatus according to claim 16, wherein the tubular article contains a multilayer structure having two or more layers, and an underlayer in contact with the outermost layer contains a polyimide resin.

* * * * *